United States Patent Office 3,635,969
Patented Jan. 18, 1972

3,635,969
PROCESS FOR THE PRODUCTION OF
TRIALLYL CYANURATE
Isao Yamada, Tokyo, Japan, assignor to Kabushiki Kaisha
Musashino Kagaku Kenkuyjo, Tokyo, Japan
No Drawing. Filed Nov. 19, 1969, Ser. No. 878,192
Claims priority, application Japan, Apr. 26, 1969,
44/32,235
Int. Cl. C07d 55/50
U.S. Cl. 260—248 CS                    10 Claims

ABSTRACT OF THE DISCLOSURE

Triallyl cyanurate is prepared by an improved process from cyanuric chloride and an aqueous allyl alcohol solution. Such improved process allows for the production of high yields of a high quality triallyl cyanurate without requiring the necessary purification of the prior art by carrying out such improved process under the following conditions:

(a) the concentration of said aqueous allyl alcohol solution must be about 70% by weight;
(b) the amount of allyl alcohol contained in said aqueous allyl alcohol solution must be about 4.5 times the molar quantity of the total amount of cyanuric chloride added;
(c) the concentration of said aqueous caustic soda solution must be about 40±0.5% by weight;
(d) additions of said aqueous caustic soda solution and cyanuric chloride must be made to said aqueous allyl alcohol solution alternately so that the reaction solution is maintained in a slightly alkaline state at all times and the temperature of the reaction solution is maintained constantly at 15±3° C.; and
(e) the total amount of the caustic soda added must be about 3.3 times the molar quantity of the total amount of the cyanuric chloride added.

The present invention relates to a process for producing triallyl cyanurate; more specifically, the present invention relates to an improved process for producing triallyl cyanurate from cyanuric chloride and an aqueous allyl alcohol solution.

Triallyl cyanurate is a compound which is very valuable as a cross-linking agent for plastics such as polyesters and methacrylic acid resins. While it has been produced for a long time using cyanuric chloride and an aqueous allyl alcohol solution as the starting materials, its production has not necessarily been an easy matter. For instance, since triallyl cyanurate is a polymerizable compound and its boiling point is high (137–140° C./0.4–0.5 mm. Hg.), a portion of its polymerizes when an attempt is made to purify it by distillation. Hence, heretofore, triallyl cyanurate could not be obtained at a high recovery rate.

Further, since the triallyl cyanurate are glacial crystals of low melting point, and most of the low polymers of triallyl cyanurate are readily soluble in organic solvents, the purification of crude triallyl cyanurate by recrystallization is very difficult. To be sure, there are instances in which good results have been obtained in the purification of crude triallyl cyanurate, using a mixture of isopropyl alcohol and water as the recrystallization solvent (Japanese patent application Publication No. 24,973/1964); however, from the standpoint of commercial production, it goes without saying that the omission of such a purification step is desirable, and the development of a process not requiring such purification step would be highly desirable.

It has now been discovered in accordance with the present invention that such a process can be provided wherein triallyl cyanurate is prepared in high yields and in high purity, thereby eliminating the necessary purification step associated with previously employed prior art processes. This is accomplished in accordance with the present invention by an improved process for producing triallyl cyanurate from cyanuric chloride and an aqueous allyl alcohol solution wherein certain essential parameters must be observed.

Accordingly, it is a principal object of the present invention to provide for an improved process for the production of triallyl cyanurate which improved process eliminates the inherent deficiencies and disadvantages of previously employed prior art processes.

It is yet a further object of the present invention to provide such an improved process for the production of triallyl cyanurate from cyanuric chloride and an aqueous allyl alcohol solution wherein the desired product is produced in high yields and high purity such as to eliminate the necessary purification step of previously employed prior art processes.

It is still a further object of the novel improved process of the present invention to provide for the production of triallyl cyanurate under hereinafter defined critical conditions such that a high purity product is produced in high yields so that further purification becomes unnecessary.

It is yet a further object of the novel process of the present invention to provide such a process wherein the following conditions are observed:

(a) The concentration of said aqueous allyl alcohol solution must be about 70% by weight;
(b) The amount of allyl alcohol contained in said aqueous allyl alcohol solution must be about 4.5 times the molar quantity of the total amount of cyanuric chloride added;
(c) The concentration of said aqueous caustic soda solution must be about 40±0.5% by weight;
(d) Additions of said aqueous caustic soda solution and cyanuric chloride must be made to said aqueous allyl alcohol solution alternately so that the reaction solution is maintained in a slightly alkaline state at all times and the temperature of the reaction solution is maintained constantly at 15±3° C.; and
(e) The total amount of the caustic soda added must be about 3.3 times the molar quantity of the total amount of the cyanuric chloride added.

Still further objects and advantages of the novel improved process of the present invention will become more apparent from the following more detailed description thereof.

Since cyanuric chloride is a chloride of cyanuric acid, the reaction by which triallyl cyanurate is formed from cyanuric chloride and allyl alcohol, when considered from the usual classification of organic chemical reactions, belongs to the reaction by which an ester and hydrochloric acid are formed from an acid chloride and alcohol. Hence, if in the reaction of cyanuric chloride with allyl alcohol, the hydrochloric acid formed is continuously neutralized and eliminated externally of the reaction system, it stands to reason that the reaction will proceed infinitely in the direction of esterification, i.e., formation of triallyl cyanurate. However, to attain the triallyl cyanurate with good efficiency, it is important that sufficient care should be exercised with respect to the concentration, amount and method of addition of the aqueous caustic soda solution to be used as the neutralizing agent of the hydrochloric acid to ensure that a compound having the hydroxyl group is not formed as a by-product as a result of the cyanuric chloride being hydrolyzed by the aqueous caustic soda solution. Again, the reaction must be controlled at the same time so as to proceed under proper conditions to ensure that the triallyl cyanurate formed after much effort is not polymerized. It has been found as a result of a close examination of the various points which have been discussed hereinabove that the foregoing objects of the present invention could be attained by carrying out the reaction of the present invention under the following conditions.

Thus, in accordance with the present invention, in producing triallyl cyanurate by reacting cyanuric chloride with allyl alcohol by a process comprising adding cyanuric chloride to an aqueous allyl alcohol solution while neutralizing the hydrochloric acid formed with an aqueous caustic soda solution, the following conditions must be observed:

(a) The concentration of said aqueous allyl alcohol solution must be about 70% by weight;
(b) The amount of allyl alcohol contained in said aqueous allyl alcohol solution must be about 4.5 times the molar quantity of the total amount of cyanuric chloride added;
(c) The concentration of said aqueous caustic soda solution must be about 40±0.5% by weight;
(d) Additions of said aqueous caustic soda solution and cyanuric chloride must be made to said aqueous allyl alcohol solution alternately so that the reaction solution is maintained in a slightly alkaline state at all times and the temperature of the reaction solution is maintained constantly at 15±3° C.; and
(e) The total amount of the caustic soda added must be about 3.3 times the molar quantity of the total amount of the cyanuric chloride added.

The non-observance of any one of the foregoing conditions (a), (b), (c), (d) and (e) results in a decline in not only the quality of triallyl cyanurate but also its yield. For example, if the concentration of either the aqueous allyl alcohol or caustic soda solution is lower than that specified above, the yield drops, whereas if the concentration is higher than that specified, a tendency toward coloration of the product triallyl cyanurate is noted. Further, since the concentration of the aqueous allyl alcohol solution is about 70% by weight, it is convenient to recover the excess allyl alcohol after the completion of the reaction. This is because the azeotropic point of allyl alcohol and water exists in a composition consisting of 72.3% allyl alcohol and 27.7% water.

The foregoing condition (d) is important, since the formation of hydroxyl group-containing compounds is prevented thereby. The addition of the aqueous caustic soda solution and cyanuric chloride must be made to said aqueous allyl alcohol solution alternately so as to ensure that the reaction solution is maintained in a slightly alkaline state at all times. This is usually satisfied in the following manner: for example, by an operation involving adding the aqueous caustic soda solution and the cyanuric chloride alternately to the aqueous allyl alcohol solution in small increments starting with the former, while checking the pH of the solution during the addition. Needless to say, the addition of the aqueous caustic soda solution and cyanuric chloride must be controlled so as to ensure that the reaction temperature is maintained in the range of 15±3° C.

The reaction time, i.e., the time required for adding the cyanuric chloride and the aqueous caustic soda solution to the aqueous allyl alcohol solution, will depend upon the rate at which the heat of neutralization is removed. This time is preferably 2–13 hours. Aging of the reaction solution for about 2.5 hours with stirring at 15±3° C., after completion of the reaction is also preferable to obtain good quality triallyl cyanurate in high yield.

To obtain still better results in accordance with the process of the present invention, it is preferable to carry out after treatments in accordance with the procedures and conditions that are hereinafter described.

When stirring is discontinued after completion of the reaction or aging, the reaction solution separates into an upper layer consisting of triallyl cyanurate containing allyl alcohol and a lower layer consisting of a common salt-saturated aqueous solution and crystalline salt which has separated out. In order to recover the triallyl cyanurate contained in the crystalline salt, water in an amount sufficient to dissolve the crystalline salt is added to this reaction solution, followed by stirring and allowing to stand to again cause the solution to separate into two layers. The triallyl cyanurate layer (upper layer) is then separated from the water layer (lower layer), and then water is added to the separated triallyl cyanurate and stirring is carried out at a temperature of 25–30° C. to accomplish the washing. The washing is repeated several times until the total water used amounts to 3–5 times by volume of the triallyl cyanurate. Each washing should not exceed 15 minutes. Again, a stirring speed exceeding 150 r.p.m. should be avoided, since a speed exceeding this limit causes emulsification and makes separation of the triallyl cyanurate difficult.

To the triallyl cyanurate whose water-washing has been completed is then added a minimum quantity of hydroquinone or hydroquinone monomethyl ether necessary for maintaining its stability for six months at room temperature. This is followed by removing the moisture content and allyl alcohol by carrying out topping at 80° C. under a reduced pressure of 20 mm. Hg and thereafter, if any floating matter is present, removing this by carrying out a filtration operation either immediately or after adding active carbon in an amount of no more than 0.1 weight percent of the triallyl cyanurate and stirring, whereupon a commercially acceptable triallyl cyanurate product of satisfactory quality is obtained.

Thus, in accordance with the present invention, it is possible to manufacture in a high yield of at least 91%, based on the cyanuric chloride, a high quality triallyl cyanurate having the following properties:

Solidifying point _____ 26.5–27.5° C.
Moisture content _____ 0.1% or less.
Purity _____ 98.5% or more.
Specific gravity _____ $d_4^{30}$=1.113–1.116.
Viscosity _____ 12–13 cps./30° C.
Refractive index _____ $n_D^{25}$=1.5070–1.5085.
APHA color _____ 10–less NOTE.—APHA=American Public Health Association.

The following examples and controls are presented for further illustration of the process of the present invention.

EXAMPLE I 213 kg. (3.66 kg. mole) of allyl alcohol and 91 liters of water were charged to a 1,000-liter reaction vessel so as to form 70% aqueous allyl alcohol and cooled to a temperature below 15° C. In addition, 39.5% aqueous caustic soda prepared from 159 liters of water and 113 kg. (2.68 kg. mole) of 95% caustic soda, and 150 kg. (0.813 kg. mole) of cyanuric chloride (powder) were kept stored in separate tanks. The reaction was then carried out by charging this aqueous caustic soda solution and cyanuric chloride alternately to the reaction vessel with stirring over a period of 7 hours. During this time the addition of the two reactants, cyanuric chloride and caustic soda, was so adjusted that the former was present in the reaction system at all times in a slightly molar excess of the latter for maintaining the reaction solution constantly in a slightly alkaline state. At the same time, the charging of the two reactants and cooling of the reaction vessel was adjusted so as to ensure that the reaction temperature did not deviate from the 15±3° C. range.

After completion of the reaction, aging of the reaction solution was carried out for a further 2.5 hours at 15±3° C. with stirring. Next, 156 liters of water were added to the reaction solution to dissolve the common salt completely, and then the solution was allowed to stand for 2 hours to accomplish its separation into two layers. The triallyl cyanurate layer (top layer) was removed and was washed twice with gentle stirring, using 500 liters of water for 15 minutes on each occasion.

After completion of the washing, 28±2 p.p.m. of hydroquinone monomethyl ether were added to the triallyl cyanurate, after which it was topped by heating at a temperature of 80° C. under a reduced pressure of 20 mm. Hg to separate the trace amount of allyl alcohol and water remaining, followed by removal of the small amount of floating matter by filtration.

Thus, 189.5 kg. of pure triallyl cyanurate were obtained at a yield of 93.5%. The solidifying point of this triallyl cyanurate was 27.2° C., its specific gravity ($d_4^{30}$) was 1.1141 and APHA color was 10.

EXAMPLE II

This experiment was operated exactly as in Example I, except that the time used for charging the aqueous caustic soda solution and cyanuric chloride was 13 hours, and hydroquinone was used as the stabilizer of triallyl cyanurate instead of hydroquinone monomethyl ether.

Pure triallyl cyanurate whose solidifying point was 26.9° C., specific gravity ($d_4^{30}$) was 1.1133 and APHA color was 10 was obtained in an amount of 185.5 kg. at a yield of 91.4%.

Controls I–X

Example I was repeated, but in these experiments, at least one of the aforesaid conditions (a)–(e) and the aging condition specified by the present invention was unsatisfied. The results thus obtained along with those of Example I are given in the following table.

| Experiment | Concentration of aq. allyl alcohol, wt. percent | Mole ratio of allyl alcohol to cyanuric chloride | Concentration of aq. caustic soda, wt. percent | Reaction temperature, °C. | Mole ratio of caustic soda to cyanuric chloride | Aging time, hr. | APHA color | Yield, percent |
|---|---|---|---|---|---|---|---|---|
| Example I | 70 | 4.5 | 39.5 | 15±3 | 3.3 | 2.5 | 10 | 93.5 |
| Control I | 50 | 4.5 | 40.0 | 15±3 | 3.3 | 2.5 | 10 | *86.7 |
| Control II | 70 | 3.5 | 39.5 | 15±3 | 3.3 | 2.5 | 15 | *89.2 |
| Control III | 70 | 4.5 | 50.0 | 15±3 | 3.3 | 2.5 | 20 | 91.3 |
| Control IV | 70 | 4.5 | 39.5 | 30±3 | 3.3 | 2.5 | 40 | 87.9 |
| Control V | 70 | 4.5 | 39.5 | 0±3 | 3.3 | 2.5 | 15 | 91.4 |
| Control VI | 70 | 6.5 | 39.5 | 15±3 | 3.3 | 2.5 | 15 | 92.5 |
| Control VII | 70 | 4.5 | 40.0 | 15±3 | 3.3 | 0 | 10 | *91.1 |
| Control VIII | 70 | 4.5 | 40.0 | 15±3 | 5.0 | 2.5 | 15 | 89.7 |
| Control IX | 90 | 4.5 | 39.5 | 15±3 | 3.3 | 2.5 | 15 | 89.2 |
| Control X | 70 | 4.5 | 39.5 | 15±3 | 3.3 | 6 | 15 | 90.6 |

*Has too high a specific gravity (1.117) and too low a solidifying point (25.5° C.).

It is apparent from the results given in the foregoing table that triallyl cyanurate of high purity can be obtained at high yields without the necessity for a purification step in accordance with the present invention, whereas if the conditions specified by this invention are deviated from, not only is it possible to obtain the triallyl cyanurate at low yields but also the necessity for purification arises owing to the low purity of the product.

What is claimed is:

1. In a process for producing triallyl cyanurate by reacting cyanuric chloride with allyl alcohol comprising adding cyanuric chloride to an aqueous allyl alcohol solution and neutralizing the hydrochloric acid so formed with an aqueous caustic soda solution, the improvement wherein said reaction is carried out under the following conditions:
   (a) said aqueous allyl alcohol solution is of a concentration of about 70% by weight;
   (b) the amount of allyl alcohol contained in said aqueous allyl alcohol solution is about 4.5 times the molar quantity of the total amount of cyanuric chloride added;
   (c) said aqueous caustic soda solution is of a concentration of about 40±0.5% by weight;
   (d) the additions of said aqueous caustic soda solution and cyanuric chloride are alternately made to said aqueous allyl alcohol solution such that the pH of reaction solution is maintained in a slightly alkaline state at all times and the temperature of the solution is maintained at 15±3° C.; and
   (e) the total amount of the caustic soda is added in an amount of about 3.3 times the molar quantity of the total amount of the cyanuric chloride added.

2. The process of claim 1 wherein the additions of said aqueous caustic soda solution and said cyanuric chloride are made to said aqueous allyl alcohol solution over a period of about 2–13 hours.

3. The process of claim 1 wherein the reaction solution is aged for a period of about 2.5 hours with stirring at a temperature of 15±3° C. after completion of the reaction.

4. The process of claim 2 wherein the reaction solution is aged for a period of about 2.5 hours with stirring at a temperature of 15±3° C. after completion of the reaction.

5. The process of claim 1 wherein the crude triallyl cyanurate is washed several times with water at a temperature of 25–30° C., each washing cycle being not more than 15 minutes, the total amount of water used for the several washing cycles being 3–5 times the volume of the crude triallyl cyanurate.

6. The process of claim 2 wherein the crude triallyl cyanurate is washed several times with water at a temperature of 25–30° C., each washing cycle being not more than 15 minutes, the total amount of water used for the several washing cycles being 3–5 times the volume of the crude triallyl cyanurate.

7. The process of claim 3 wherein the crude triallyl cyanurate is washed several times with water at a temperature of 25–30° C., each washing cycle being not more than 15 minutes, the total amount of water used for the several washing cycles being 3–5 times the volume of the crude triallyl cyanurate.

8. The process of claim 5 wherein the washed triallyl cyanurate is topped at a temperature of 80° C. and a reduced pressure of 20 mm. Hg after having added thereto 28±2 p.p.m. of a compound selected from hydroquinone and hydroquinone monomethyl ether.

9. The process of claim 6 wherein the washed triallyl cyanurate is topped at a temperature of 80° C. and a reduced pressure of 20 mm. Hg after having added thereto 28±2 p.p.m. of a compound selected from hydroquinone and hydroquinone monomethyl ether.

10. The process of claim 7 wherein the washed triallyl cyanurate is topped at a temperature of 80° C. and a reduced pressure of 20 mm. Hg after having added thereto 28±2 p.p.m. of a compound selected from hydroquinone and hydroquinone monomethyl ether.

References Cited

UNITED STATES PATENTS

| 2,510,564 | 6/1950 | Dudley | 260—248 X |
| 2,557,667 | 6/1951 | Kropa | 260—248 X |
| 3,127,399 | 3/1964 | Lundberg | 260—248 |

JOHN M. FORD, Primary Examiner